(12) United States Patent
Atwell

(10) Patent No.: US 6,561,784 B1
(45) Date of Patent: May 13, 2003

(54) CAKE OR BREAD PRODUCT COMPRISING MULTIPLE DOUGHS APPARATUS FOR MANUFACTURING SAME

(76) Inventor: Edwin G. Atwell, R.R. #1 Almonte, Almonte ON (CA), K0A 1A0

(*) Notice: Subject to any disclaimer, the term of this patent is extended or adjusted under 35 U.S.C. 154(b) by 0 days.

(21) Appl. No.: 09/560,328

(22) Filed: Apr. 28, 2000

(51) Int. Cl.⁷ .......................... A21C 11/16; A21C 11/18
(52) U.S. Cl. .................... 425/133.1; 425/287; 425/288; 99/354
(58) Field of Search .............................. 425/130, 131.1, 425/287, 288; 99/353, 450.1, 450.2, 450.7, 494, 354

(56) References Cited

U.S. PATENT DOCUMENTS

| 4,619,598 A | 10/1986 | Abe et al. |
| 4,648,828 A | 3/1987 | Abe et al. |

Primary Examiner—Nina Bhat

(57) ABSTRACT

Provided is an apparatus for making a bread or cake product comprising two or more types of dough, wherein the dough are dispensed through a dispensing hole of a dough hopper having a dough container, and dough dispensing pistons, the method comprising substantially preventing the two or more doughs from commingling in the dough from the dough hopper.

10 Claims, 3 Drawing Sheets

CAKE OR BREAD PRODUCT COMPRISING MULTIPLE DOUGHS APPARATUS FOR MANUFACTURING SAME

FIELD OF THE INVENTION

The invention relates to the field of preparing and shaping of doughs for cake and bread products.

BACKGROUND OF THE INVENTION

Baked, boiled and fried cereal products, such as breads, bagels, pretzels, doughnuts, doughnut holes, and crullers have been enjoyed since before recorded history. With the advent of automation, the tasks of preparing and shaping of dough prior to cooking have been taken over by machines. A dough hopper is commonly used for automatically dispensing portions of dough, particularly doughnuts, either onto a tray or mould for subsequent baking, or into hot oil or boiling water for either frying or boiling. The dough hopper comprises a container for dough, with a hole, connected to a dough guiding tube for dispensing dough. Fitting into the hole, and the dough guiding tube, are pistons, which, upon rising and falling, pull dough into the dough guiding tube and alternately extrude and shear off portions dough, which drop from the hopper and may be cooked immediately or stored uncooked. Different piston-head s apes may be used, to vary the look of the product. To dispense a simple toroid-shaped doughnut, the piston heads are usually disc shaped. To dispense what is commonly called a French Cruller, the piston-heads have oblique flutes, and they are rotated with respect to one another, as they rise and fall, with the result that the portion of dough that is sheared off and dispensed has a fluted surface.

To satisfy consumer demand, it has been proposed, in U.S. Pat. No. 4,619,598 (to Abe et al), to dispense a doughnut comprising a plurality of doughs, by using a separator that divides the dough container and the dough guiding tube.

The separator comprises a boss arranged between a centrally located dough-dispensing piston rod and two peripherally located dough-dispensing piston rods.

SUMMARY OF THE INVENTION

In one aspect the invention provides a method of making a bread or cake product comprising two or more types of dough, wherein the doughs are dispensed through a dispensing hole of a dough hopper having a dough container, and dough dispensing pistons, the method comprising substantially preventing the two or more doughs from commingling in the dough container prior to dispensing; and dispensing the two or more doughs from the dough hopper.

In a second aspect, the invention provides a doughnut comprising two or more types of dough, the two or more types of dough being confined to substantially distinct areas of the doughnut.

In a third aspect, the invention provides an apparatus for use with a dough hopper, the dough hopper comprising a dough container, dough-dispensing pistons and a dough dispensing hole, whereby a bread or cake product comprising two or more types of dough may be dispensed, the apparatus comprising a partition for dividing the dough container into two or more chambers, each chamber being in communication with the dough dispensing hole.

In a fourth aspect, the invention provides a method of making doughnut or doughnut hole comprising two or more types of dough, the doughs being plastic in their uncooked state, the method comprising shaping each dough to a desired shape; attaching the doughs one-to-another to form a cohesive mass; and forming the cohesive mass into individual doughnuts or doughnut holes.

DETAILED DESCRIPTION OF PREFERRED EMBODIMENTS

The method of the invention provides a bread or cake product having more than one kind of dough. An example would be a doughnut having chocolate and vanilla dough. The multi-dough product is produced by separating the different doughs in the dough container of the dough hopper, to prevent them from commingling, and then dispensing the doughs. The doughs are separated from each other by one or more partitions placed in the dough container. The partitions form different chambers in the dough container, each chamber being in communication with the hole through which the doughs are dispensed. The different doughs are each placed in separate chambers. With particularly viscous doughs, the partition may be removed after the doughs are placed in the container.

In a preferred embodiment, the partitions may be attached to a cylinder placed centrally in the dough container. The cylinder passes around the dough-dispensing piston rods, so that they operate as they would in the absence of the device of the invention.

Conventional doughnut hoppers use a piston assembly having two piston heads. The bottom piston head is connected to a single centrally located piston rod which passes through the top piston head. The top piston head is connected to two peripherally located piston rods which pass on either side of the single centrally located piston rod. The size of the piston heads and the corresponding dough-guiding tube substantially determine the size of the doughnut that is dispensed. Conventional doughnuts are usually less than about six inches in diameter, and in particular between about 4 and 1.5 inches in diameter. The clearance between the two peripherally located piston rods and the single centrally located piston rod is usually minimal. Therefore, it is preferred that the partition of the apparatus of the invention not pass between the single centrally located piston rod and a peripherally located piston rod.

The apparatus of the invention can be used with the pistons that are normally used with the dough hopper. If desired, the pistons may be changed to make, for example, toroid-shaped doughnuts or French crullers. The same apparatus can dispense doughnuts or crullers comprising more than one kind of dough, merely by changing the pistons, just as would be done in the absence of the apparatus of the invention.

The method and apparatus of the invention are particularly suited for conventional toroid-shaped doughnuts.

For best performance and an aesthetically pleasing product, the different doughs should have similar consistencies. If necessary, the consistency of each dough can be altered, for example, by adding water, or by adding flour.

The apparatus of the invention allows the dough hopper and pistons to be disassembled easily permitting access to all parts so that the pistons and the apparatus of the invention may be cleaned.

It is preferred that the partition be secured in place in the dough container, for example by screws or bolts. Butterfly screws or bolts permit easy installation and removal of the apparatus.

The partition can be provided by any member or partition that will split the dough container into chambers. The partition need not be straight, but can have, for example, a serpentine or round form, thereby splitting the dough container into wavy-sided or round-sided chambers, respectively. The chambers need not be equal in size. The chambers need not be sealed one from another, provided that one type of dough can not seep around unsealed edges and commingle with a dough of another type. The more liquid the dough, the tighter the seal at the sides of the chamber should be. The partition should not interfere with the conventional operation of the pistons. It does not pass through the piston head.

In a preferred embodiment, used to make two-coloured or two-flavoured doughnuts, the partition is provided by a sheet which is placed across the middle of the dough container attached to a cylinder located centrally in the dough container. The cylinder passes around the pistons, permitting them to operate as in the absence of the apparatus of the invention. The partition divides the dough container into two equal chambers, each chamber being in communication with the dispensing hole.

For particularly stiff or viscous doughs, the top of the hopper can be closed, and, compressed air may be pumped into the hopper, in order to push the dough into the pistons.

BRIEF DESCRIPTION OF THE DRAWINGS

The invention will be further described with reference to the figures.

In FIG. 1 can be seen a device according to the invention, partially inserted into a conventional doughnut hopper. The device depicted is particularly suited for dispensing cake doughnuts. The device has a blade-shaped or sheet-like partition (3), which is placed in the hopper dough container (1), and when in place is secured to the sides of the dough container (1) by attachment rods (4) which are secured by butterfly screws (5). The partition does not pass substantially into the dough-guiding tube. When the dough hopper is in operation, the device (3) divides the dough container (1) into two equal chambers. The blade-shaped partition (3), is attached to a cylindrical central portion, through which dough dispensing piston rods (2) pass. This permits the dough-dispensing piston rods (2) to operate normally, as in the absence of the apparatus of the invention. One dough, for example chocolate, is placed in the chamber on one side of the device (3), and another dough, for example vanilla, is placed in the chamber on the opposite side of the device.

The pistons of conventional hoppers usually require "priming", whereby several irregular pieces of dough are dispensed, at the start of dispensing, before aesthetically pleasing doughnuts are dispensed.

When the device of the invention is used with runny doughs in particular, the hole at the bottom end of the cylindrical central portion, joining the two chambers, can be blocked, while the doughs are being placed in the container, for example, with a plastic scraper or spatula. This prevents the first dough placed in a first chamber from seeping into the other chamber, before the second dough has been placed in the other chamber. Once the doughs are in place, the scraper or spatula may be removed, and the pistons actuated.

Figure 2:
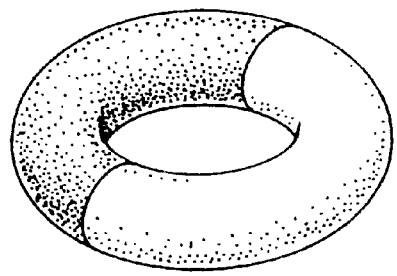
FIG. 2 shows an example of a doughnut produced by the method of the invention.

The dough dispensing pistons (2) alternately rise and fall, pulling in both doughs and causing portions of dough of each type to be dispensed simultaneously. In the course of dispensing the chocolate "half doughnut" and the vanilla "half doughnut" join as they pass through the dough-guiding tube at the bottom of the hopper by flowing together at the ends. The result is a doughnut as depicted in FIG. 2.

A cake or bread product produced by the method of the invention can be cooked immediately after being dispensed, or it may be stored, for example, by freezing.

Figure 1:
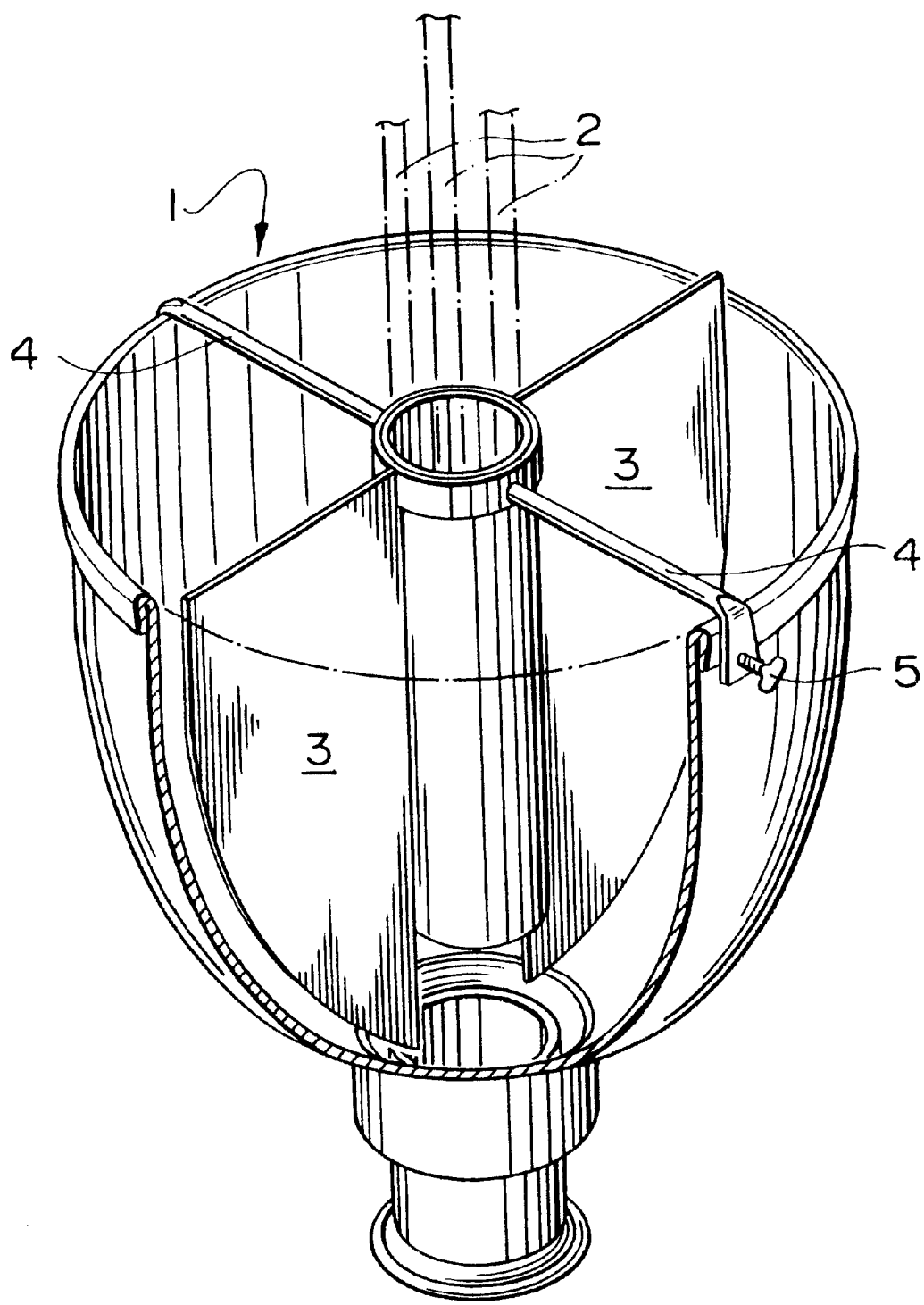
FIG. 1 shows an example of apparatus according to the invention.
Figure 3:
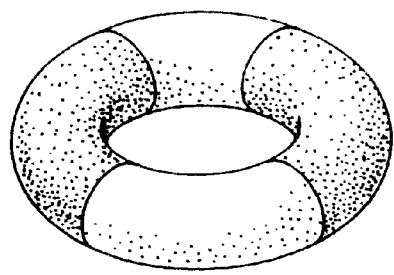
FIG. 3 shows an example of a doughnut produced by the method of the invention.

The different doughs can be in various geometrical relationships to each other. For example, the embodiment depicted in FIG. 1 results in doughnuts having one half that comprises one dough, and the other half that comprises another dough, as shown in FIG. 2. The partition could also define, for example, four equal chambers, resulting in a doughnut having four quarters, each of which could comprise a different dough, or two types of dough could be alternated in the quarters, for a "checkerboard" pattern. This is shown in FIG. 3. Essentially any number of chambers can be formed in a "pie-wedge" arrangement (i.e. where the chambers each define a sector of the ellipse defined by the rim of the dough container). The maximum number of sector chambers would be limited in that each added chamber further divides the dispensing hole, and eventually each chamber would have a portion of the dispensing hole that was too small to permit dough to flow through. This would depend on the flowability of the doughs. In a preferred embodiment less than 10 chambers are formed. Performance is enhanced with 6 or fewer chambers.

The partition need not pass through the centre of the dough container, but may define a chord. The result would be a doughnut having uneven divisions of different coloured or flavoured doughs.

Figure 5:
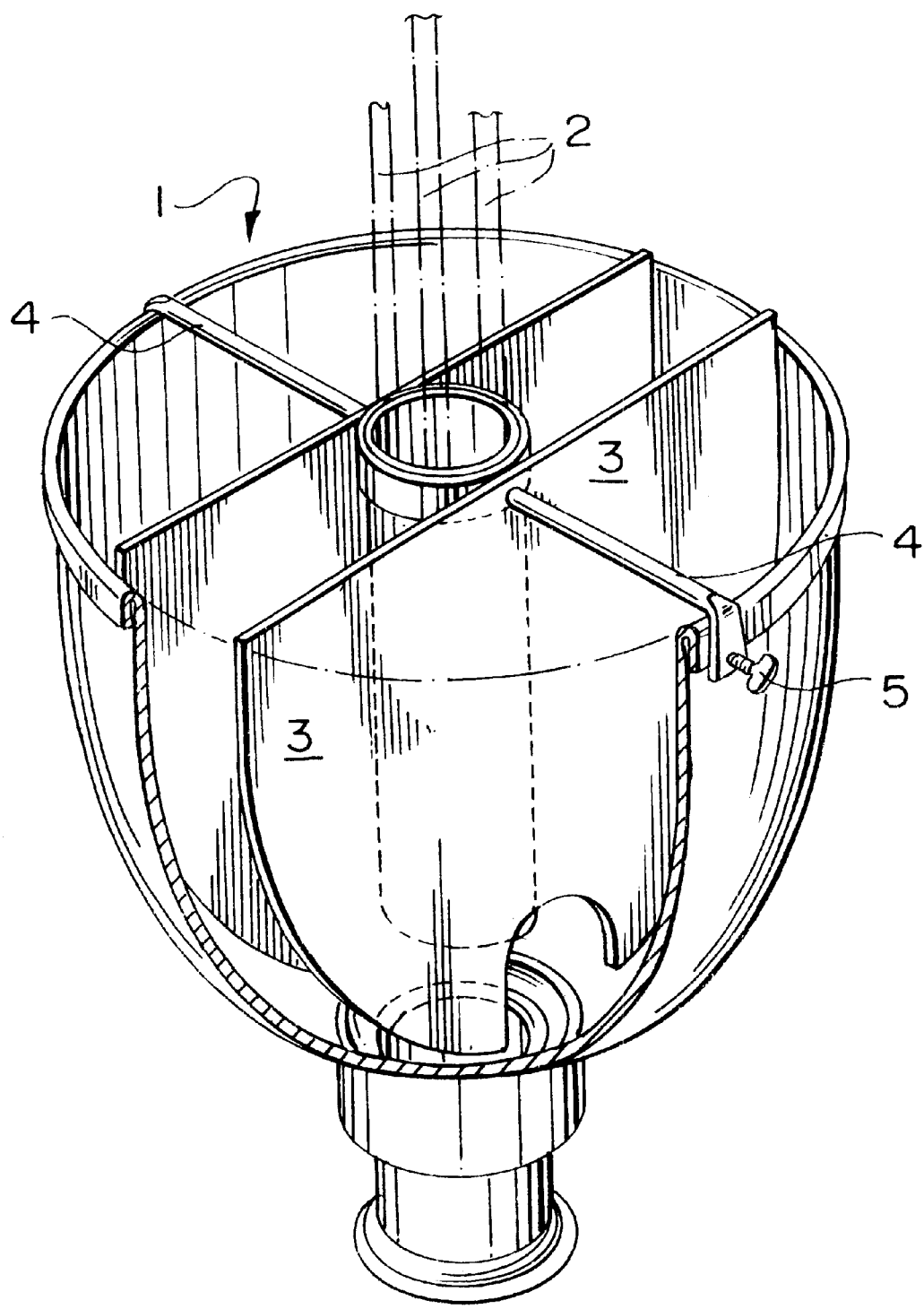
FIG. 5 shows an example of an apparatus according to the invention.

This is illustrated in FIG. 5, in which two partitions (3) are present, each attached tangentially to the centrally located cylinder which surrounds the dough-dispensing pistons (2). The dough container is thus divided into three compartments, resulting in a doughnut divided into three colour or flavour regions.

The partition can also take the form of a hollow cylinder open at both ends. The hollow cylinder is passed over the centrally located cylinder which surrounds the dough dispensing rods (2), thereby defining a smaller chamber in the centre of the dough container, and a concentric larger chamber surrounding the smaller chamber. The result is a doughnut having a central section of one dough type (i.e. around the doughnut hole), and a surrounding peripheral section of a second dough type.

The partition can be a plurality of partitions.

The method of the invention is particularly suited for making doughnuts, doughnut holes and crullers. A doughnut hole being a doughnut having a shape other than toroid, for example a spheroid.

A doughnut according to the invention comprises two or more types of dough, the two or more types of dough being confined to substantially distinct areas of the doughnut. The interface between two dough types may by somewhat blurred, as some commingling will occur, however the doughnuts of the invention are distinct from traditional "marbled" products, in which the distribution of the doughs is random. In a preferred embodiment, the different doughs form a distinct geometric design or pattern, as described above in the examples of partition that may be used.

In a conventional toroid-shaped doughnut, the diameter of the hole typically represents from less than about 30% of the diameter of the doughnut. Preferred doughnuts are those having a substantially non-lumpy surface and an even thickness around the toroid. A preferred thickness is between about 1" to about 2".

Because the doughs coalesce prior to dispensing, if the consistencies of doughs are properly chosen the resulting doughnut will be a substantially smooth toroid, or in the case of a cruller, a substantially even fluted toroid.

Figure 4:
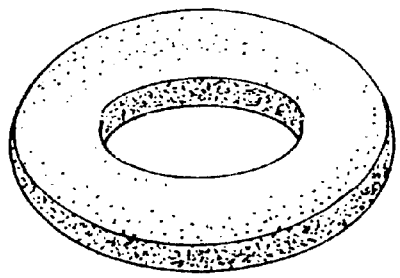
FIG. 4 shows an example of a doughnut produced by the method of the invention.

In one embodiment of the invention, a method is provided for making a doughnut or doughnut hole comprising two or more doughs, wherein the doughs are plastic prior to cooking. A preferred example of this method will be illustrated with a two-coloured doughnut (and doughnut hole): one dough, for example chocolate, is rolled to a desired thickness. A second dough, for example, vanilla, is rolled out, preferably to the same thickness as the chocolate dough. The chocolate dough is then placed on top of the vanilla dough, to form two layers. If necessary, the two doughs are again rolled out, to achieve the desired thickness for cutting. Doughnuts and doughnut holes may then be cut with a doughnut cutter. The result is a doughnut or doughnut hole having a chocolate layer and a vanilla layer, as depicted in FIG. 4. This same method can be used with three or more doughs as well, resulting in multilayer doughnuts or doughnut holes.

What is claimed is:

1. An apparatus for use with a dough hopper, the dough hopper comprising a dough container, dough-dispensing pistons and a dough dispensing hole, whereby a bread or cake product comprising two or more types of dough may be dispensed, the apparatus comprising a partition for dividing the dough container into two or more chambers, each chamber being in communication with the dough dispensing hole, the partition not passing through a head of a piston.

2. An apparatus according to claim 1, wherein the partition has sheet-like shape, and when the partition is placed in the dough container it divides the container vertically into two or more chambers, each of which chambers communicates with the dispensing hole.

3. An apparatus according to claim 1, wherein the partition is attached to a support cylinder, the support cylinder passing around the dough-dispensing pistons.

4. An apparatus according to claim 1, wherein the bread or cake product is a doughnut or cruller.

5. An apparatus according to claim 1, wherein the bread or cake product is a doughnut hole.

6. An apparatus according to claim 1, wherein the bread or cake product is a doughnut.

7. A dough hopper comprising the apparatus of claim 1.

8. An apparatus according to claim 1, wherein the partition is held in place in the dough container by fastening rods and attachment means.

9. An apparatus according to claim 1, wherein the attachment means are screws which screw onto the sides of the dough container.

10. An apparatus according to claim 1, wherein the screws are butterfly screws.

* * * * *